United States Patent
Sun et al.

(10) Patent No.: US 6,900,792 B2
(45) Date of Patent: May 31, 2005

(54) HOUSING FOR FLAT PANEL DISPLAYS AND METHOD FOR RECEIVING FLAT PANEL DISPLAYS

(75) Inventors: Kai-Yu Sun, Hsin-chu Hsien (TW); Han-Chou Liu, Pan-chiao (TW)

(73) Assignee: AU Optronics Corp., Hsinchu (TW)

( * ) Notice: Subject to any disclaimer, the term of this patent is extended or adjusted under 35 U.S.C. 154(b) by 314 days.

(21) Appl. No.: 09/981,706

(22) Filed: Oct. 19, 2001

(65) Prior Publication Data

US 2002/0047829 A1 Apr. 25, 2002

(30) Foreign Application Priority Data

Oct. 19, 2000 (TW) ........................................ 89121997 A

(51) Int. Cl.$^7$ ................................................ H05K 7/16
(52) U.S. Cl. ..................... 345/156; 345/87; 40/124.01; 40/406; 40/421; 40/448; 361/600; 361/671; 361/681
(58) Field of Search ................ 345/87, 156; 40/124.01, 40/460, 421, 448, 406; 361/600, 671, 681

(56) References Cited

U.S. PATENT DOCUMENTS

| | | | | |
|---|---|---|---|---|
| 4,299,043 A | * | 11/1981 | Lathrop et al. ................ 40/624 |
| 5,283,967 A | * | 2/1994 | Abrams ......................... 40/779 |
| 5,682,182 A | * | 10/1997 | Tsubosaka .................... 345/173 |
| 5,768,096 A | * | 6/1998 | Williams et al. ............. 361/681 |
| 6,006,243 A | * | 12/1999 | Karidis ......................... 708/100 |
| 6,139,331 A | * | 10/2000 | Owen ........................... 434/408 |
| 6,373,213 B1 | * | 4/2002 | Watanabe et al. ........... 318/445 |
| 6,501,641 B1 | * | 12/2002 | Kim et al. .................... 361/681 |
| 6,634,124 B1 | * | 10/2003 | Bierschbach ................. 40/452 |
| 2002/0050977 A1 | * | 5/2002 | Hsieh et al. ................. 345/156 |
| 2002/0113919 A1 | * | 8/2002 | Liu et al. ...................... 349/65 |

* cited by examiner

*Primary Examiner*—Bipin Shalwala
*Assistant Examiner*—Vincent E. Kovlaick
(74) *Attorney, Agent, or Firm*—Bacon & Thomas PLLC

(57) ABSTRACT

A housing for receiving a flat panel display. The housing for receiving a flat panel display includes a front frame having a central opening, side frames that surround at least part of the edges of the flat panel display, a bottom frame to combine with the front frame, the side frames to form a space to locate said flat panel display, and optionally at least one stopping frame to prevent the flat panel display from being released.

20 Claims, 1 Drawing Sheet

HOUSING FOR FLAT PANEL DISPLAYS AND METHOD FOR RECEIVING FLAT PANEL DISPLAYS

BACKGROUND OF THE INVENTION

1. Field of the Invention

The present invention relates to a housing for a display and, more particularly, to a housing for a flat panel display and a method for assembling the housing and the flat panel display.

2. Description of Related Art

Currently, a flat panel display is protected or fixed in an assembly of frames to prevent from foreign impact and occasional release of parts. Generally, a flat panel display such as liquid crystal display is arranged in a plastic bottom frame from the top. Then the flat panel display is combined and enveloped by a top frame and a front frame to form a full assembly of flat panel display module. The combination of the top frame, the bottom frame and the front frame is often achieved though the assistance of screws. However, current methods for assembling flat panel displays need many complicate frames (e.g. bottom frames, top frames and front frames). Furthermore, many molds for manufacturing these frames (either metals of plastics) are also needed. In other words, for developing a new flat panel display module, it requires long time, high cost, and complicated coordination between molds manufacturers and molds users. In addition, these current frames and flat panel displays are not easy to assembled or disassembled. Therefore, designs for these assemblies of current frames and flat panel displays are not good for manufacturing.

Therefore, it is desirable to provide an improved assembly or method to mitigate the aforementioned problems.

SUMMARY OF THE INVENTION

The object of the present invention is to provide a housing for a flat panel display which can be easily assembled and disassembled.

Another object of the present invention is to provide a housing for a flat panel display to save the time and the cost for developing, assembling and disassembling the housing and the flat panel display.

Another object of the present invention is to provide a housing for a flat panel display with reduced thickness, reduced volume and reduced weight.

Another object of the present invention is to provide an easy method for receiving a flat panel display module to save the time and the cost for developing, assembling and disassembling the housing and the flat panel display.

Another object of the present invention is to provide an easy method for receiving a flat panel display module to simplify the steps for assembling and disassembling the flat panel display module and the housing for the flat panel display.

Another object of the present invention is to provide an easy method for receiving a flat panel display module to further reduce the thickness, the volume and the weight of the assembly of the flat panel display module and the housing.

The method for receiving a flat panel display of the present invention includes following steps, (A) providing a housing comprising: a front frame having a central opening, wherein the inner edge of said frame defines an active area for said flat panel display; a plurality of side frames to surround at least part of the edges of said flat panel display, wherein the height of said side frame is not less than the thickness of said flat panel display; a bottom frame to combine with said front frame, said side frames to form a space to locate said flat panel display; and at least one stopping frame to prevent said flat panel display from sliding out of said space formed by said side frames, said front frame and said bottom frame; (B) sliding said flat panel display into said space surrounded and formed by said side frames, said front frame and said bottom frame; and (C) combining said stopping frame with said side frames, said front frame and said bottom frame to close said space formed by said side frames, said front frame and said bottom frame.

To achieve the objects the housing for receiving a flat panel display of the present invention includes: a front frame having a central opening, wherein the inner edge of said frame defines an active area for said flat panel display; a plurality of side frames to surround at least part of the edges of said flat panel display, wherein the height of said side frame is not less than the thickness of said flat panel display; a bottom frame to combine with said front frame, said side frames to form a space to locate said flat panel display; and optionally at least one stopping frame to prevent said flat panel display from sliding out of said space formed by said side frames, said front frame and said bottom frame The housing for receiving a flat panel display of the present invention includes: (A) providing a housing comprising: a front frame having a central opening, wherein the inner edge of said frame defines an active area for said flat panel display; a plurality of side frames to surround at least part of the edges of said flat panel display, wherein the height of said side frame is not less than the thickness of said flat panel display; a bottom frame to combine with said front frame, said side frames to form a space to locate said flat panel display; and at least one stopping frame to prevent said flat panel display from sliding out of said space formed by said side frames, said front frame and said bottom frame; (B) sliding said flat panel display into said space surrounded and formed by said side frames, said front frame and said bottom frame; and (C) combining said stopping frame with said side frames, said front frame and said bottom frame to close said space formed by said side frames, said front frame and said bottom frame.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
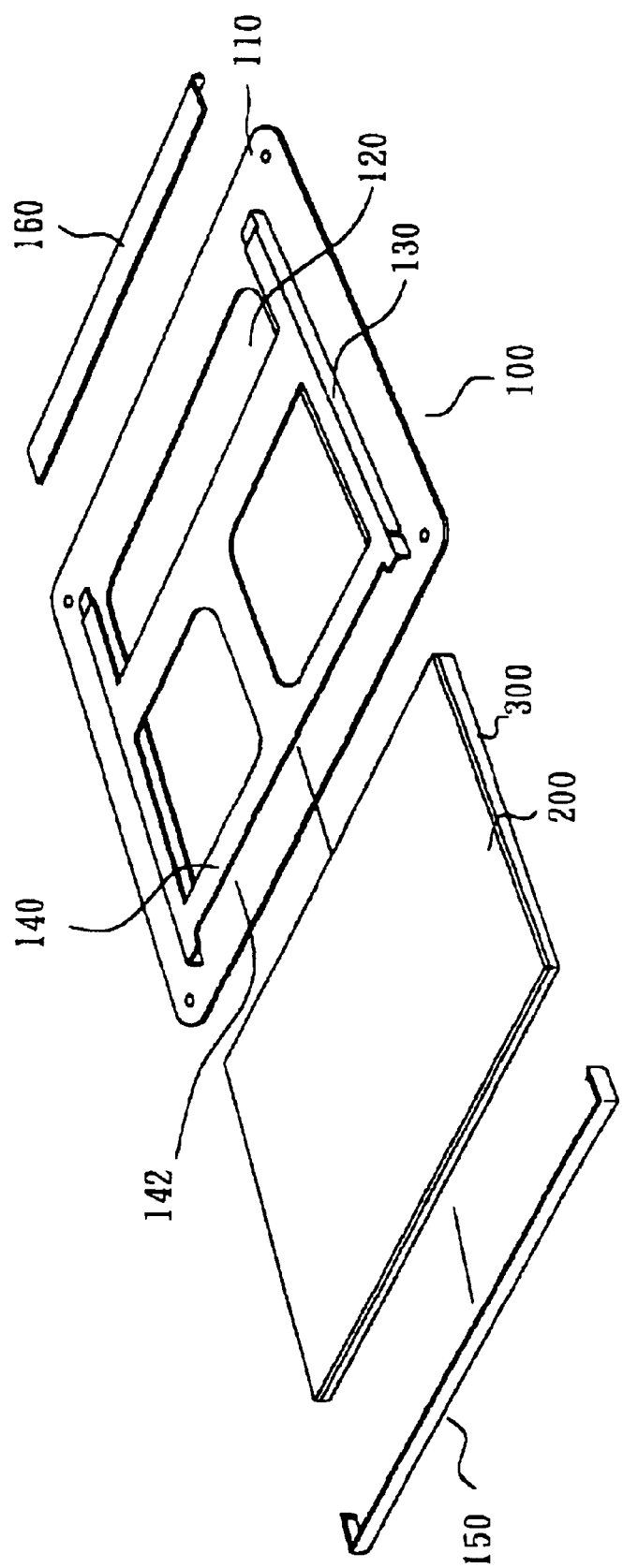
FIG. 1 is a perspective view of the combination of the flat panel display and the housing of the present invention.

The housing of the present invention can be used for any conventional flat panel display (e.g. OLED, LCD, FED, PDP). Preferably, the housing of the present invention is used for a liquid crystal display panel. The frames of the present invention can be bound by many means. The means for binding frames of the present invention can be any conventional binding unit. Preferably, the binding unit is a male/female unit, a combination of tenons and grooves, or a hook. Most preferably, the binding unit is a hook. The bottom frame of the present invention can be in any conventional forms. The stopping frames can be any conventional frames Preferably, at least one stopping frame is a reflector for light. The stopping frame of the present invention can selectively further comprise at least a binding unit on the surface of said stopping frame to combine or fasten said stopping frame with said side frames, said front frame or said bottom frame. The side frames can be any conventional frames. Preferably, the height of said side frame and said stopping frame is greater than the combined thickness of at least one flat panel display and/or a backlight module. Furthermore, the side frame can selectively be integrated with the bottom frame or the front frame as manufactured. Moreover, additional parts can be attached to the side frames, the bottom frame and the front frame to add the function of these frames. Preferably, the bottom frame comprises at least a binding unit on the surface of said bottom frame to combine or fasten said bottom frame with said side frames, said front frame or said stopping frame. The frames (e.g. the front frames, the bottom frames, the side frames and the stopping frames) of the present invention can be made of any conventional materials. Preferably, the frames (e.g. the front frames, the bottom frames, the side frames and the stopping frames) of the present invention is made of metals or plastics.

With reference to FIG. 1, there is shown a housing and a flat panel display of the present invention. In the present embodiment, the flat panel display is a combination of a backlight module and a liquid crystal display panel. The backlight module 300 in the present invention includes a light guide, a light source (e.g. CCFL), diffuser sheets and prism sheets. The housing 100 of the present embodiment includes a front frame 110, a bottom frame 140, two side frames 130 and two stopping frames 150 and 160. One of the stopping frames 160 is a reflector of light for reflecting the light into the lightguide of the backlight module 300. The front frame 110 is a frame with a central or lateral opening 142. In the present embodiment, the central or lateral opening 142 is in a rectangle shape. The inner edge of the front frame 110 defines an active area 120 of the flat panel display 200 (i.e. liquid crystal display panel) for displaying words, pictures and images after assembling is achieved. The side frame 130 used in the present embodiment is a frame with long blade. The side frame 130 is arranged on and protruded from the surface of the front frame 110 to provide the height for the space surrounded by these frames. The bottom frame 140 is used for locating the liquid crystal display panel 200 and the backlight module 300. The distance between these two side frames is about the width of the combination of the liquid crystal display panel 200 and the backlight module 300. In most cases, either front frames 110 or bottom frames 140 are integrated with side frames 130 as they are manufactured. In other words, the side frames 130 are formed on the front frames 110 or bottom frames 140 when either front frames 110 or bottom frames 140 are manufactured (e.g. through inject molding). On the other hand, there are two stopping frames 150 and 160 to close the space formed by the front frame 110, the side frames 130 and the bottom frame 140. One of the stopping frames 160 having a reflecting surface for light in the inner surface of the stopping frame 160 to act as a light reflector for the CCFL (cold cathode fluorescent light) light of the backlight module 300. On each stopping frame 150 and 160 or each side frame 130, at least two binding units integrated with the stopping frame 150 or the side frame 130 can be found. The binding units are used to combine and fasten the stopping frames 150 and 160 with the side frames 130, the front frame 110 or the bottom frame 140. Furthermore, the stopping frame 150 is also used to prevent the liquid crystal display panel 200 and the backlight module 300 from releasing out of the space formed by these frames (e.g. the front frame 110, the bottom frame 140 and the side frames 130). In the present embodiment, the binding units are hooks. The frames (e.g. the front frame 110, the bottom frame 140 and the side frames 130) of the embodiment here are made of plastics. The plastic frames makes the weight of the housing of the present embodiment much more lighter.

When the liquid crystal display panel 200 and the backlight module 300 are assembled together, a housing 100 with a space for sliding in the display panel 200 and the backlight module 300 is formed and provided first. The housing used here is a housing 100 as illustrated above. The liquid crystal display panel 200 and the backlight module 300 are slid from the lateral opening 142 of the space into the space surround by the frames. The stopping frames 150 and 160 are subsequent close the lateral opening 142 of the space to close the space. The liquid crystal display panel 200 and the backlight module 300 are limited and fixed in the frames. The stopping frames 150 and 160 are fixed and combined with the side frames 130, front frames 110 or bottom frames 140 through hooks on the stopping frames 150 and 160.

Since the flat panel display is slid into the space of the housing of the present invention through lateral opening of the space, the flat panel display can be assembled and disassemble d much more easily. Moreover, on the top surface of the flat panel display, only one frame (e.g. the front frame) is needed to combine with the bottom frame, so that the number of frames for assembling is less than the number of the traditional frames. In other words, compared with the traditional assembly of the conventional frames and the flat panel display, the assembly of the flat panel display and the housing of the present invention is thinner, lighter and smaller. On the other hand, the side frames are formed on the front frames or bottom frames when either front frames or bottom frames are manufactured (e.g. through inject molding). Therefore, the molds for manufacturing these frames of the housing of the present invention are less than the molds needed for traditional frames for flat panel displays. This means that much time and cost for developing, manufacturing new molds or frames for flat panel display can be saved greatly.

Although the present invention has been explained in relation to its preferred embodiment, it is to be understood that many other possible modifications and variations can be made without departing from the spirit and scope of the invention as hereinafter claimed.

What is claimed is:

1. A housing for receiving a flat panel display, comprising:
   a front frame having a central opening, wherein the inner edge of said front frame defines an active area for said flat panel display;
   a plurality of side frames to surround at least part of the edges of said flat panel display, wherein the height of said side frame is not less than the thickness of said flat panel display;
   a bottom frame to combine with said front frame, said side frames to form a space to locate said flat panel display;
   optionally at least one stopping frame to prevent said flat panel display from sliding out of said space formed by said side frames, said front frame and said bottom frame; and
   wherein the at least one stopping frame is a reflector for light.

2. The housing as claimed in claim 1, wherein said stopping frame comprises at least a binding unit on the surface of said stopping frame to combine or fasten said stopping frame with said side frames, said front frame or said bottom frame.

3. The housing as claimed in claim 2, wherein said binding unit is a hook.

4. The housing as claimed in claim 1, wherein the height of said side frame and said stopping frame is greater than the combined thickness of at least one flat panel display and/or a backlight module.

5. The housing as claimed in claim 1, wherein said flat display panel is a liquid crystal display panel.

6. The housing as claimed in claim 1, wherein said front frame is made of plastic or metal.

7. A housing for receiving a flat panel display, comprising:
- a front frame having a central opening, wherein the inner edge of said front frame defines an active area for said flat panel display;
- a plurality of side frames to surround at least part of the edges of said flat panel display, wherein the height of said side frame is not less than the thickness of said flat panel display;
- a bottom frame to combine with said front frame, said side frames to form a space to locate said flat panel display;
- optionally at least one stopping frame to prevent said flat panel display from sliding out of said space formed by said side frames, said front frame and said bottom frame; and
- wherein said side frame comprises at least a binding unit on the surface of said side frame to combine or fasten said side frame with said stopping frames, said front frame or said bottom frame.

8. The housing as claimed in claim 7, wherein said binding unit is a hook.

9. A housing for receiving a flat panel display, comprising:
- a front frame having a central opening, wherein the inner edge of said front frame defines an active area for said flat panel display;
- a plurality of side frames to surround at least part of the edges of said flat panel display, wherein the height of said side frame is not less than the thickness of said flat panel display:
- a bottom frame to combine with said front frame, said side frames to form a space to locate said flat panel display; and
- optionally at least one stopping frame to prevent said flat panel display from sliding out of said space formed by said side frames, said front frame and said bottom frame; and
- wherein said bottom frame comprises at least a binding unit on the surface of said bottom frame to combine or fasten said bottom frame with said side frames, said front frame or said stopping frame.

10. The housing as claimed in claim 9, wherein said binding unit is a hook.

11. A method for receiving a flat panel display, comprising following steps:
- (A) providing a housing comprising:
  - a front frame having a central opening, wherein the inner edge of said frame defines an active area for said flat panel display;
  - a plurality of side frames to surround at least part of the edges of said flat panel display, wherein the height of said side frame is not less than the thickness of said flat panel display;
  - a bottom frame to combine with said front frame, said side frames to form a space to locate said flat panel display; and
  - at least one stopping frame to prevent said flat panel display from sliding out of said space formed by said side frames, said front frame and said bottom frame, and said at least one stopping frame is a reflector for light;
- (B) sliding said flat panel display into said space surrounded and formed by said side frames, said front frame and said bottom frame; and
- (C) combining said stopping frame with said side frames, said front frame and said bottom frame to close said space formed by said side frames, said front frame and said bottom frame.

12. The method as claimed in claim 11, wherein said stopping frame comprises at least a binding unit on the surface of said stopping frame to combine or fasten said stopping frame with said side frames, said front frame or said bottom frame.

13. The method as claimed in claim 12, wherein said binding unit is a hook.

14. The method as claimed in claim 11, wherein the height of said side frame and said stopping frame is greater than the combined thickness of at least one flat panel display and/or a backlight module.

15. The method as claimed in claim 11, wherein aid flat display panel is a liquid crystal display panel.

16. The method as claimed in claim 11, wherein said side frame comprises at least a binding unit on the surface of said side frame to combine or fasten said side frame with said stopping frames, said front frame or said bottom frame.

17. The method as claimed in claim 16, wherein said binding unit is a hook.

18. The method as claimed in claim 11, wherein said bottom frame comprises at least a binding unit on the surface of said bottom frame to combine or fasten said bottom frame with said side frames, said front frame or said stopping frame.

19. The method as claimed in claim 18, wherein said binding unit is a hook.

20. The method as claimed in claim 11, wherein said front frame is made of plastic or metal.

* * * * *